United States Patent [19]

Stoev et al.

[11] 4,267,046

[45] May 12, 1981

[54] METHOD AND APPARATUS FOR DEWATERING OF FINE-GRAINED MATERIALS

[76] Inventors: Stoycho M. Stoev, 51, Blvd. Kl. Gottwald; Ivan M. Sapunarov, 1, Suhodolska Str.; Vladimir K. Ivanov, 6, Blvd. Kiskinov, all of Sofia, Bulgaria

[21] Appl. No.: 694,241

[22] Filed: Jun. 24, 1976

[30] Foreign Application Priority Data

Jun. 9, 1975 [BG] Bulgaria ................................. 30233

[51] Int. Cl.² ............................................. B01D 35/20
[52] U.S. Cl. ..................................... 210/780; 210/388
[58] Field of Search ............ 210/77, 388, 397, 497 R, 210/499; 209/274, 275, 365–367, 250, 251, 281, 282

[56] References Cited

U.S. PATENT DOCUMENTS

| 1,330,371 | 2/1920 | Griswold | 209/275 |
| 1,585,413 | 5/1926 | Price | 209/250 X |
| 2,246,483 | 6/1941 | Dillon | 210/388 X |
| 3,047,150 | 7/1962 | Dumont | 209/274 X |

FOREIGN PATENT DOCUMENTS

655221  1/1963  Canada ...................................... 210/77

*Primary Examiner*—William A. Cuchlinski, Jr.

[57] ABSTRACT

A method for concentrating and dewatering fine-grained materials wherein the material is delivered by a feeder to the central portion of a pressing chamber in an arcuately shaped housing. A profiled sieve is mounted in the housing. An electric motor imparts a vertical-elliptical oscillatory motion to the housing at a frequency up to 160 Hz and at an amplitude from up to 5 mm.

An apparatus for performing the aforementioned method, comprising a frame on which an electric motor is secured. A housing is supported by springs on the frame. The housing is arcuately shaped and a sieve extends along the whole length of the arcuately shaped housing. The sieve divides the housing into a pressing chamber and a dewatering chamber. In the bottom portion of the dewatering chamber there is provided a pipe for discharging liquid from the dewatering chamber. In the axes of the springs supporting the housing there are provided regulator bolts for limiting the amplitude of the vibratory motion of the housing.

6 Claims, 1 Drawing Figure

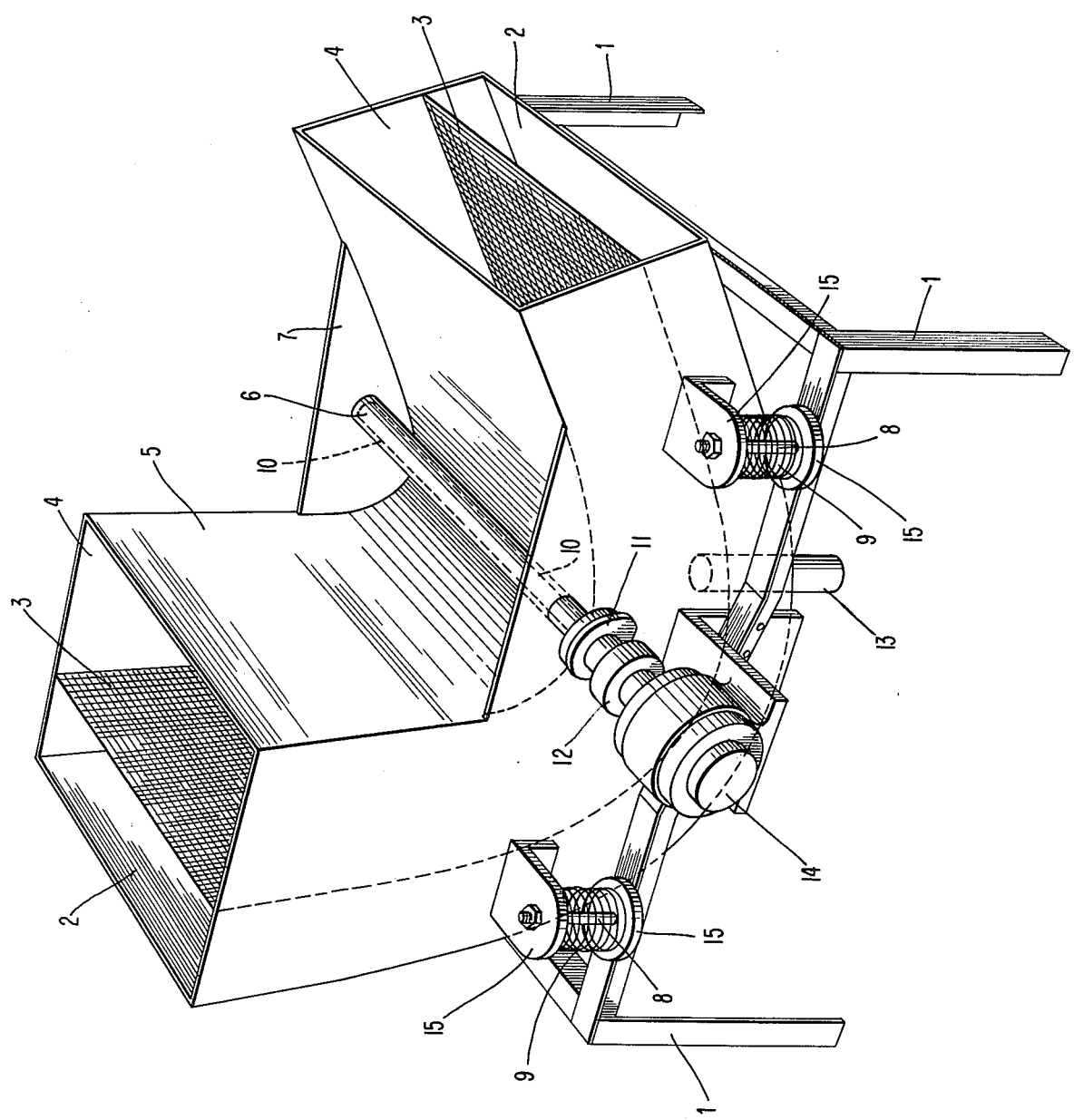

METHOD AND APPARATUS FOR DEWATERING OF FINE-GRAINED MATERIALS

BACKGROUND OF THE INVENTION

The invention relates to a method and an apparatus for concentrating and simultaneously dewatering fine-grained materials. The method and apparatus of the invention is therefore adaptive to produce finished products of reduced moisture content which have been concentrated (densified).

Different methods for dewatering are known. For example, methods employing filtration, drying, thickening, centrifugating, etc. are already known in the art. The most advantageous method used contrifugation, which gives satisfactory results. The drawbacks of this last-mentioned method and of the other methods are that great capital investments are necessary; such methods usually require a high consumption of electric energy, and the apparatus for carrying out such methods must be assembled using rigorous constructional standards, etc.

Different constructions for carrying out the aforementioned methods are known. For example, such an apparatus may include known vibrational dewatering sieves, vibrational centrifuges, mechanical precipitation devices, different types of vacuum filters, precipitation centrifuges, etc. The drawbacks of the known constructions reside in their complexity, their relatively high consumption of electric energy, and their bulk, i.e., they demand large spatial requirements, etc.

SUMMARY OF THE INVENTION

It is therefore a general object of the present invention to provide a method and an apparatus for concentrating (densifying) and dewatering fine-grained materials with which method the aforementioned drawbacks are avoided.

In accordance with the method of this invention for concentrating and dewatering fine-grained materials, the material is delivered by a feeder to the central portion of a pressing chamber from whence it passes onto a profiled sieve which oscillates, when the apparatus is in operation, with a vertical elliptical oscillatory motion having a frequency up to 160 Hz and an amplitude of up to 5 mm.

The apparatus comprises an electric motor which is secured to a frame. A shaft extends through at least one of two opposite side walls of the housing and is operatively connected to these side walls. The shaft is also connected via flexible coupling means to the electric motor. The motor further includes unbalancing elements. The housing is supported by means of springs on the frame and is divided by the sieve into a pressing chamber and a dewatering chamber. In the bottom portion of the dewatering chamber there is disposed a pipe for discharging the liquid present in the fine-grained material to be treated.

BRIEF DESCRIPTION OF THE DRAWING

For a better understanding of the invention, its operating advantages and specific objects attained by its use, reference should be made to the accompanying drawing, in which there is illustrated a preferred embodiment of the invention.

The single FIGURE of the drawing illustrates schematically in perspective an illustrative embodiment of the apparatus of the invention.

DESCRIPTION OF THE PREFERRED EMBODIMENT

In accordance with the invention, the apparatus of the invention has an arcuately shaped housing 5, which is divided into two chambers 2 and 4 by means of a profiled sieve 3 mounted in the housing 5. The lower chamber 2 is a dewatering chamber. The upper chamber 4 functions as a pressing chamber. The arcuately shaped housing 5 is supported by means of coil springs 9 (illustratively four) on the frame 1. Each coil spring is provided with a regulator bolt 8 which extends along the axis of the coil spring 9. The regulator bolt 8 limits and regulates the vibrating amplitude of the corresponding spring 9. The electric motor 14 is rigidly supported on the frame 1 and is connected by means of an elastic connection 12 to the shaft 10. The shaft 10 passes through one of the side walls 7 and is also operatively connected to the other side wall 7 as to impart a vibratory movement to the housing 5. There are attached flanges 15 to the housing 5. The lower flanges 15 rest on the frame 1. Two unbalancing elements 11 are attched to the shaft 10. A pipe 13 is connected to the bottom portion of the dewatering chamber 2. The shaft 10 is disposed inside a protecting pipe 6 in the space between both side walls 7.

The apparatus of the invention operates as follows:

When the electric motor 14 is switched on, the unbalancing elements 11 impart a forced oscillation onto the whole system. The thus-produced vibrational effect carries out a compressing of the fine-grained material, supplied to the pressing chamber, along the whole length of the pressing chamber 4. As a result, the water and the other admixtures pass through the profiled sieve 3 into the dewatering chamber 2 and are discharged through a pipe 13. The concentrated and dewatered product thus leaves, by virtue of the vibrational action, the pressing chamber 4.

Although the invention is illustrated and described with reference to a single preferred embodiment thereof, it is to be expressly understood that it is in no way limited by the disclosure of such a single embodiment, but is capable of numerous modifications within the scope of the appended claims.

What is claimed is:

1. A method of concentrating and dewatering fine-grained materials, comprising the steps of
    feeding the fine-grained material to be treated into a pressing chamber disposed in an arcuately shaped housing with an inlet and an outlet opening, wherein a sieve divides the housing into an upper pressing chamber and a lower dewatering chamber, the lowermost portion of said sieve in said housing being disposed below said inlet and outlet openings,
    imparting a vertical-elliptical oscillatory vibrating motion onto said housing, said motion having a frequency up to 160 Hz and an amplitude up to 5 mm,
    whereby said fine-grained material passes through said sieve from said pressing chamber into said dewatering chamber, and
    discharging water from the dewatering chamber.

2. The method as set forth in claim 1, wherein the bottom wall of the dewatering chamber is substantially imperforated, and the discharging of liquid from said dewatering chamber is effected via a discharge pipe.

3. An apparatus for concentrating and dewatering fine-grained materials, comprising in combination,
a support frame;
an electric motor rigidly supported on said frame;
an arcuately shaped housing having an inlet and an outlet opening;
spring means supporting said housing on said frame;
a sieve mounted in said housing and dividing said housing into an upper pressing chamber and a lower dewatering chamber, the lowermost portion of said sieve in said housing being disposed below said inlet and outlet openings;
said electric motor being operatively connected to said housing so as to vibrate it at a preselected frequency and amplitude when said motor is energized; and
a discharge pipe on said housing extending from said dewatering chamber and adapted to discharge liquid therefrom.

4. The apparatus as set forth in claim 3, wherein the bottom wall of the dewatering chamber is substantially imperforated and the discharge pipe extends from at least substantially the lowest portion of said bottom wall of the dewatering chamber.

5. The apparatus as set forth in claim 3, wherein said electric motor is adapted to impart a vibratory motion to said housing, said motion having a frequency up to 160 Hz and an amplitude up to 5 mm.

6. The apparatus as set forth in claim 3, wherein said spring means include a plurality of coil springs, each coil spring having a limit bolt extending along its axis and being operatively connected to the coil spring for limiting the maximum amplitude of the vibratory motion of said housing.

* * * * *